(12) United States Patent
Hanes et al.

(10) Patent No.: US 9,174,715 B1
(45) Date of Patent: Nov. 3, 2015

(54) APPARATUSES FOR CHANGING GEAR IN MARINE PROPULSION SYSTEMS

(71) Applicant: Brunswick Corporation, Lake Forest, IL (US)

(72) Inventors: Theodore J. Hanes, Fond du Lac, WI (US); David T. Syson, Theresa, WI (US)

(73) Assignee: Brunswick Corporation, Lake Forest, IL (US)

( * ) Notice: Subject to any disclaimer, the term of this patent is extended or adjusted under 35 U.S.C. 154(b) by 81 days.

(21) Appl. No.: 14/077,754

(22) Filed: Nov. 12, 2013

Related U.S. Application Data

(60) Provisional application No. 61/783,442, filed on Mar. 14, 2013.

(51) Int. Cl.
*B63H 20/20* (2006.01)
*B63H 23/08* (2006.01)
*F16D 23/12* (2006.01)

(52) U.S. Cl.
CPC ............... *B63H 20/20* (2013.01); *B63H 23/08* (2013.01); *F16D 23/12* (2013.01); *F16D 2023/123* (2013.01)

(58) Field of Classification Search
CPC ......... B63H 20/20; B63H 23/08; B63H 23/20
See application file for complete search history.

(56) References Cited

U.S. PATENT DOCUMENTS

| | | | |
|---|---|---|---|
| 3,455,420 A | 7/1969 | Blanchard, Jr. | |
| 4,043,226 A | 8/1977 | Buuck | |
| 4,223,773 A | 9/1980 | Croisant et al. | |
| 4,412,826 A | 11/1983 | Jones et al. | |
| 4,527,441 A * | 7/1985 | Nakahama | ....................... 74/378 |
| 4,570,776 A * | 2/1986 | Iwashita et al. | ............ 192/114 R |
| 4,579,204 A | 4/1986 | Iio | |
| 4,637,802 A | 1/1987 | Taguchi et al. | |
| 4,789,366 A | 12/1988 | Hale et al. | |
| 4,986,774 A | 1/1991 | Wantz | |
| 5,051,102 A | 9/1991 | Onoue | |
| 5,059,144 A | 10/1991 | Onoue | |
| 5,310,370 A | 5/1994 | Onoue | |
| 5,788,546 A | 8/1998 | Ogino | |
| 5,839,928 A | 11/1998 | Nakayasu et al. | |
| 5,910,191 A | 6/1999 | Okamoto | |
| 6,062,360 A | 5/2000 | Shields | |
| 6,123,591 A | 9/2000 | Onoue | |
| 6,401,560 B1 | 6/2002 | Sato | |
| 6,544,083 B1 | 4/2003 | Sawyer et al. | |
| 6,817,461 B1 | 11/2004 | Sawyer et al. | |
| 2003/0047020 A1 | 3/2003 | Ikeya | |

FOREIGN PATENT DOCUMENTS

JP    11-334694    12/1999

* cited by examiner

*Primary Examiner* — Richard Lorence
(74) *Attorney, Agent, or Firm* — Andrus Intellectual Property Law, LLP

(57) ABSTRACT

An apparatus is for a changing gear in a marine propulsion system. A cam rotates about a first axis with a shift shaft. The cam has a body and an arm that radially extends from the body with respect to the first axis. A cam follower moves parallel to a second axis that is perpendicular to the first axis to cause movement of a clutch, thereby enacting a gear change. The cam follower defines a pocket that is elongated with respect to the second axis and a recess that extends from the pocket along a third axis that is perpendicular to the first and second axes. The cam is disposed in the pocket and the arm extends into the recess. During a constant rotation of the shift shaft in a first direction about the first axis, the cam follower moves with respect to the second axis to enact the gear change and also dwells with respect to the second axis.

20 Claims, 7 Drawing Sheets

APPARATUSES FOR CHANGING GEAR IN MARINE PROPULSION SYSTEMS

CROSS-REFERENCE TO RELATED APPLICATION

The present application claims the benefit of and priority to U.S. Provisional Patent Application Ser. No. 61/783,442, filed Mar. 14, 2013, which is hereby incorporated herein by reference in entirety.

FIELD

The present disclosure relates to apparatuses for changing gear in marine propulsion systems.

BACKGROUND

U.S. Pat. No. 6,544,083, which is incorporated herein by reference in entirety, discloses a gear shift mechanism in which a cam structure comprises a protrusion that is shaped to extend into a channel formed in a cam follower structure. The cam follower structure can be provided with first and second channels that allow the protrusion of the cam to be extended into either which accommodates both port and starboard shifting mechanisms. The cam surface formed on the protrusion of the cam moves in contact with a selected cam follower surface formed in the selected one of two alternative channels to cause the cam follower to move axially and to cause a clutch member to engage with either a first or second drive gear.

U.S. Pat. No. 6,817,461, which is incorporated herein by reference in entirety, discloses a clutch mechanism for changing gear in a marine propulsion system having a cam member that is rotatable about a first axis in coordination with the rotation of a shift shaft. A cam follower is associated with the cam member and supported for axial movement along a second axis. The cam follower is provided with cam follower surface segments that cause the cam follower to move axially in a direction parallel to the second axis in response to rotation of the cam member about the first axis between first and second rotational positions. Further rotation of the cam member from the second rotational position to a third rotational position causes no further movement of the cam follower because of the shape and position of cam follower surface segments that allow continual contact between the cam member and the cam follower while allowing rotation of the cam member without associated axial movement of the cam follower.

U.S. Pat. No. 8,435,090, which is incorporated herein by reference in entirety, discloses a marine drive comprising a gear case housing a vertical drive shaft that rotates a generally horizontal propulsor shaft in a forward direction upon operational engagement with a forwardly rotatable gear and rearward direction upon operational engagement with a rearwardly rotatable gear. A lubricant exclusion cover is disposed between the forwardly and rearwardly rotatable gears so as to limit churning of lubricant by at least one of the forwardly and rearwardly rotatable gears.

A variety of shift mechanisms for changing gear in marine propulsion systems exist in the prior art, examples of which are described in the above-referenced U.S. patents. In some examples, a device that is commonly referred to as a bell crank mechanism has high efficiency, but does not provide a dwell function to allow for over-travel. In other examples, a device commonly referred to as a desmodromic mechanism is a cam that is constrained in size, which leads to high pressure angles and low mechanical efficiency.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

During research and development, the present inventors have found that it is desirable to provide shift mechanisms having high mechanical efficiency to reduce the shift force required, particularly in mechanical systems that are manually operated. The inventors have also found that it is desirable to provide such shift mechanisms with dwell functionality to ensure full shift engagement while allowing for part tolerance and improper adjustment of cables and/or shift linkages. The present disclosure results from the inventors endeavors to provide such shift mechanisms having high mechanical efficiency and dwell functionality. Examples described herein have increased efficiency over the prior art, thus reducing the force required for a shift, and also have dwell functionality that ensures proper shift engagement even with high part tolerances and varying cable or linkage adjustment.

In certain examples, an apparatus for changing gear in a marine propulsion system has a shift shaft that rotates about a first axis; a cam that rotates about the first axis with the shift shaft, the cam having a body and an arm that radially extends from the body with respect to the first axis; an output shaft that rotates about a second axis that is perpendicular to the first axis; a clutch that moves in a direction parallel to the second axis to enact a gear change in the marine propulsion system; and a cam follower that moves parallel to the second axis to cause movement of the clutch, thereby enacting the gear change. The cam follower defines a pocket that is elongated with respect to the second axis and a recess that extends from the pocket along a third axis that is perpendicular to the first and second axes. The cam is disposed in the pocket and the arm extends into the recess. During a constant rotation of the shift shaft in a first direction about the first axis, the cam follower moves with respect to the second axis to enact the gear change and also dwells with respect to the second axis.

In some examples, during said constant rotation of the shift shaft in the first direction, the cam follower first remains stationary with respect to the second axis, then is moved along the second axis to cause movement of the clutch, and thereafter again remains stationary with respect to the second axis. During a constant rotation of the shift shaft in an opposite, second direction about the first axis, the cam follower first remains stationary with respect to the second axis, then is moved along the second axis to cause movement of the clutch, and thereafter again remains stationary with respect to the second axis.

In some examples, when the shift shaft is rotated with respect to the cam follower, the cam first rotates through a first dwell zone wherein the cam does not engage with the cam follower, the cam then rotates through an actuating zone wherein the cam engages with and moves the cam follower, and the cam then rotates through a second dwell zone wherein the cam follower does not engage with the cam follower.

The recess can be at least partially defined by first and second actuated surfaces that extend along the third axis and first and second dwell surfaces that extend at opposite taper angles with respect to the third axis. When the shift shaft rotates in the first direction, the arm rotates past the first dwell surfaces in the first dwell zone, then the arm engages the first actuating surface in the first actuating zone, and then the arm rotates past the second dwell surface in the second dwell zone.

BRIEF DESCRIPTION OF DRAWINGS

Examples of apparatuses for changing gear in marine propulsion systems are described with reference to the following drawing figures. The same numbers are used throughout the figures to reference like features and components.

DETAILED DESCRIPTION OF DRAWINGS

In the present description, certain terms have been used for brevity, clearness and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Figure 1:
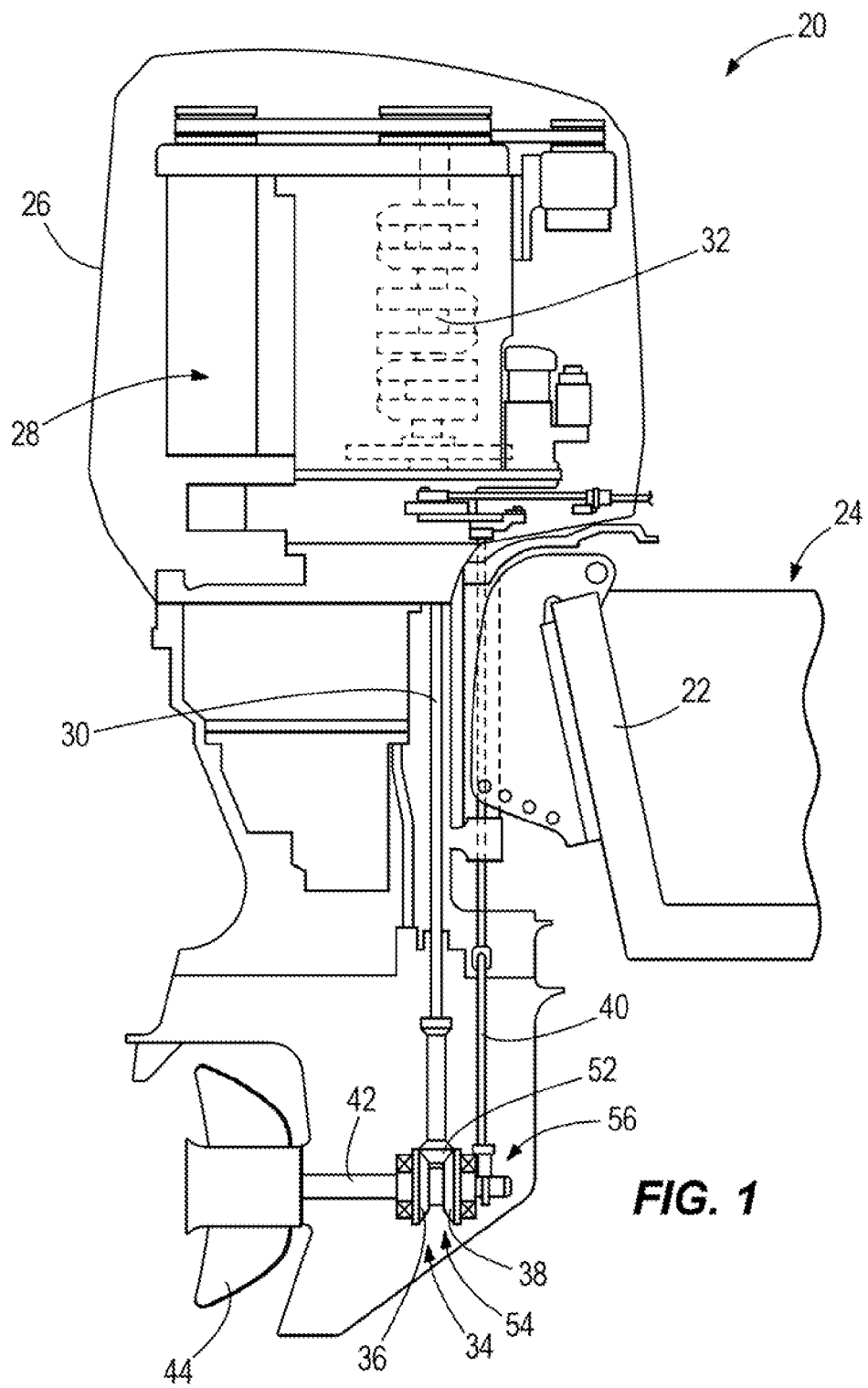
FIG. 1 depicts an outboard motor attached to a transom of a marine vessel.

FIG. 1 depicts an outboard motor 20 that is attached to a transom 22 of a marine vessel 24 in a conventional manner. The outboard motor 20 has a cowl 26 that covers an internal combustion engine 28. A drive shaft 30 extends downwardly from the internal combustion engine 28 and is connected in torque transmitting relation to a crank shaft 32 on the internal combustion engine 28. A transmission 34 connects the drive shaft 30 in torque transmitting relation with first and second drive gears 36, 38, respectively. A propeller 44 is attached to an output shaft 42 and rotates therewith for providing thrust to the marine vessel 24. The output shaft 42, which can be referred to as a propeller shaft, is connectable in torque-transmitting relation with the drive shaft 30 by a clutch 54 to cause the output shaft 42 and propeller 44 to rotate in either clockwise or counterclockwise directions. A shift shaft 40 is operatively connected to a shift mechanism 56 via a shift mechanism 56 for causing the clutch 54 to assume one of three gear positions, including a position connecting the drive shaft 30 to the first drive gear 36 for rotation in a first direction, a position connecting the drive shaft 30 to the second drive gear 38 for rotation in an opposite, second direction, and a position where the drive shaft 30 is not connected to the first and second drive gears 36, 38. The shift mechanism 56 is described in more detail herein below.

Figure 2:
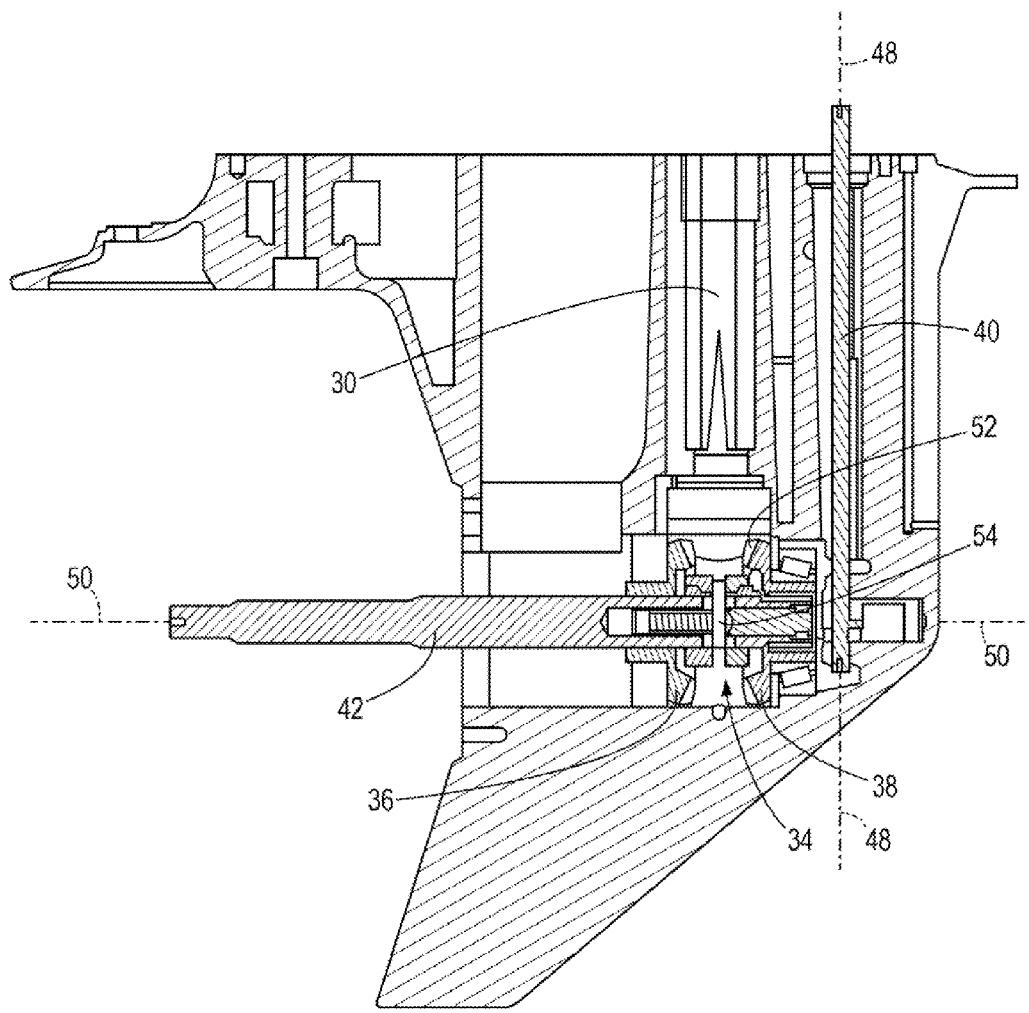
FIG. 2 is a sectional view of a lower portion of the outboard motor.

As shown in FIG. 2, the shift shaft 40 is supported for rotation about a first axis 48. The output shaft 42 is supported for rotation about a second axis 50, which is perpendicular to the first axis 48. The first and second drive gears 36, 38 are rotatable about the second axis 50 and are disposed in torque-transmitting relation with a bevel gear 52, which is attached to the bottom end of the drive shaft 30 and disposed in gear-tooth-meshing relation with the first and second drive gears 36, 38. Rotation of the shift shaft 40 about the first axis 48 in a first direction causes the clutch 54 to move in a first direction parallel to the second axis 50. Rotation of the shift shaft 40 about the first axis 48 in an opposite, second direction causes the clutch 54 to move in a second direction parallel to the second axis 50. Such movement of the clutch 54 allows the clutch 54 to assume one of the three alternative positions described herein above, including a position in which the clutch 54 is engaged with the first drive gear 36, a position in which the clutch 54 is engaged with the second drive gear 38, and a neutral position wherein the clutch 54 is not engaged with either of the first and second drive gears 36, 38. The neutral position is shown in FIG. 2.

Figure 3:
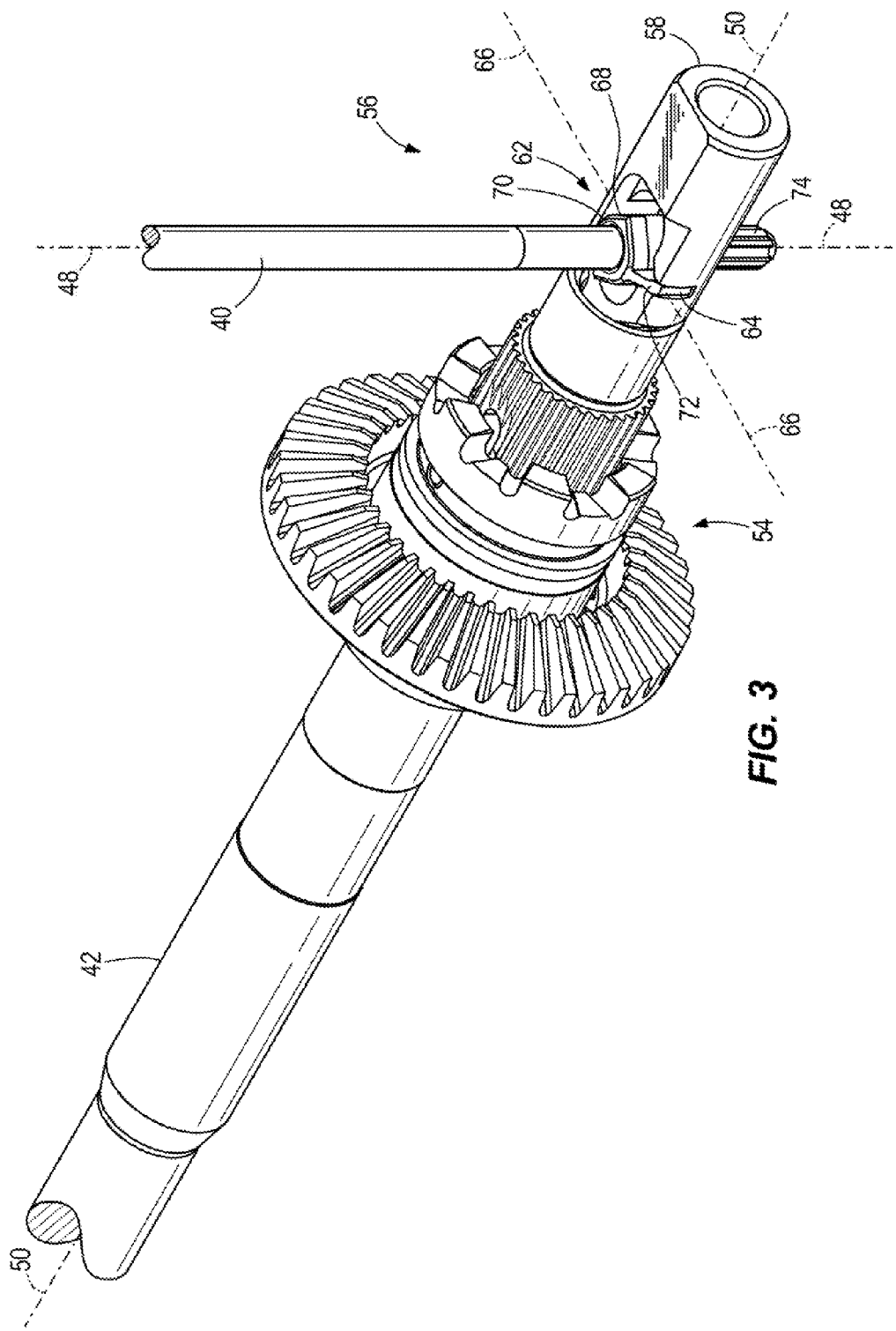
FIG. 3 is an isometric view of an apparatus according to the present disclosure.
Figure 4:
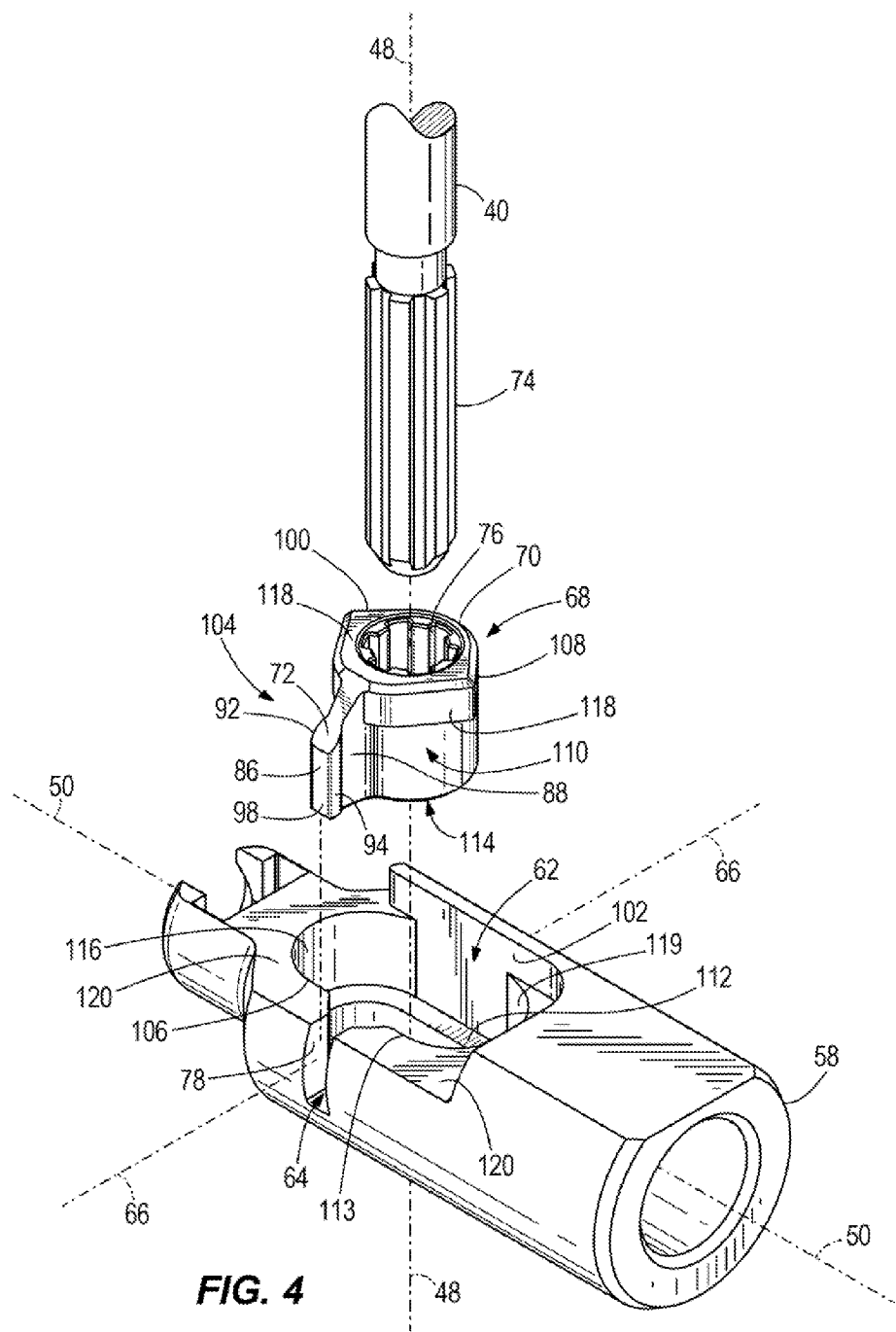
FIG. 4 is an exploded view of the apparatus.

FIGS. 3 and 4 depict one example of the shift mechanism 56 for changing gear in the outboard motor 20. The shift mechanism 56 includes a cam follower 58 that moves parallel to the second axis 50 to thereby cause movement of the clutch 54. In this particular example, movement of the cam follower 58 along the second axis 50 causes movement of a conventional actuator member (not shown) parallel to the second axis 50, which in turn acts upon the clutch 54, thereby enacting the noted gear change. The cam follower 58 defines a pocket 62 that is elongated with respect to the second axis 50. The cam follower 58 also defines a recess 64 that extends from the pocket 62 along a third axis 66 that is perpendicular to the first and second axes 48, 50. The shift mechanism 56 also includes a cam 68 that rotates about the first axis 48 with the shift shaft 40. The cam 68 has a body 70 and an arm 72 that radially extends from the body 70 with respect to the first axis 48. The cam 68 is disposed in the pocket 62 and the arm 72 extends into the recess 64. In this example, the cam 68 is attached to the shift shaft 40 via a splined connection, wherein splines 74 on the shift shaft 40 are engaged with splines 76 inside of the cam 68. In other examples, the cam 68 can be attached to the shift shaft 40 by other means that cause the cam 68 to rotate together with the shift shaft 40 about the first axis 48, or the cam 68 could be formed with the shift shaft 40 as a single component.

As shown in FIGS. 5-12, the recess 64 is defined by first and second actuated surfaces 78, 80 that extend along the third axis 66 (FIG. 4) and first and second dwell surfaces 82, 84 that extend at opposite taper angles with respect to the third axis 66. The recess 64, viewed in a plane defined by the second and third axes 50, 66, has a Y-shape. The arm 72 of the cam 68 has a head 86 and a stem 88. The stem 88 has a radially outer end connected to the body 70 and a radially inner end connected to the head 86. The head 86, when viewed in the plane defined by the second and third axes 50, 66, is wider than the stem 88. The head 86 has opposing convex first and second actuating surfaces 92, 94 that engage with the first and second actuated surfaces 78, 80 of the recess 64, as will be described further herein below. The head 86 also has a planar end surface 98 that extends between the convex first and second actuating surfaces 92, 94 and faces the first and second dwell surfaces 82, 84 when the cam 68 rotates past the first and second dwell surfaces 82, 84, as will be described further herein below.

The shape and dimensions of the cam follower 58 and cam 68 can vary from that shown. In the example shown in the present application, FIG. 4, the cam follower 58 generally is cylindrical in shape. The pocket 62 has a bottom surface 112 upon which a bottom surface 114 of the cam 68 rests. The pocket 62 has opposing, curved end surfaces 116, 119 that are symmetrical and shaped to receive the cylindrically shaped lower portion of the cam 68, such that the cam 68 can rotate with respect to either end of the pocket 62. The upper portion of the cam 68 has opposed flanges 118. The height of the flanges 118 on the cam 68 is such that the bottoms of the flanges 118 rest on a top surface 120 of the cam follower 58 on opposite sides of the pocket 62. Modifications are possible while still achieving the functional aspects described hereinabove.

FIGS. 5-12 depict rotational movement of the cam 68 as the shift shaft 40 is rotated in a first, clockwise first direction about the first axis 48. Rotation of the cam 68 causes linear movement of the cam follower 58 parallel to the second axis 50 to enact a gear change by the clutch 54, as described hereinabove. As shown in the figures, at certain points during the rotation of the shift shaft 40 and cam 68 in the first clockwise direction, the cam follower 58 also dwells with respect to the second axis 50, i.e. the cam follower 58 does not move linearly or substantially does not move linearly along or with respect to the second axis 50.

Figure 5:
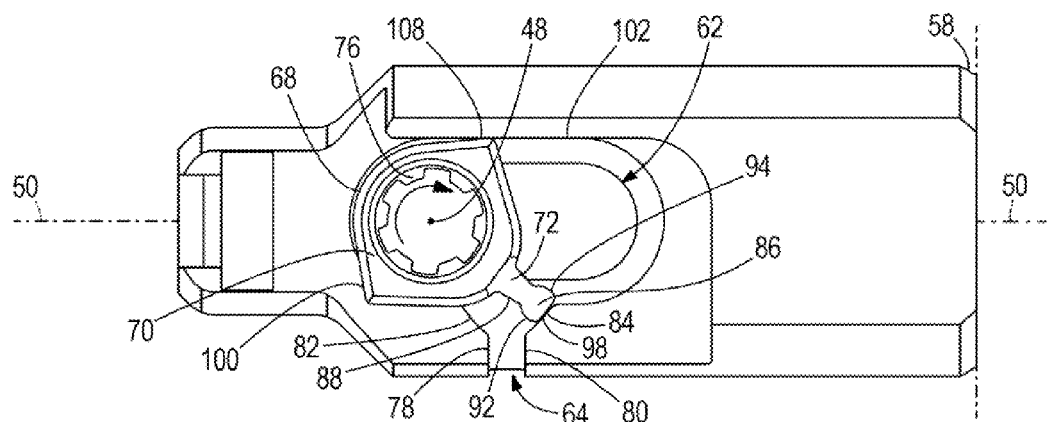
FIGS. 5-12 are top views of the apparatus, showing movement of a cam and a cam follower.
Figure 6:
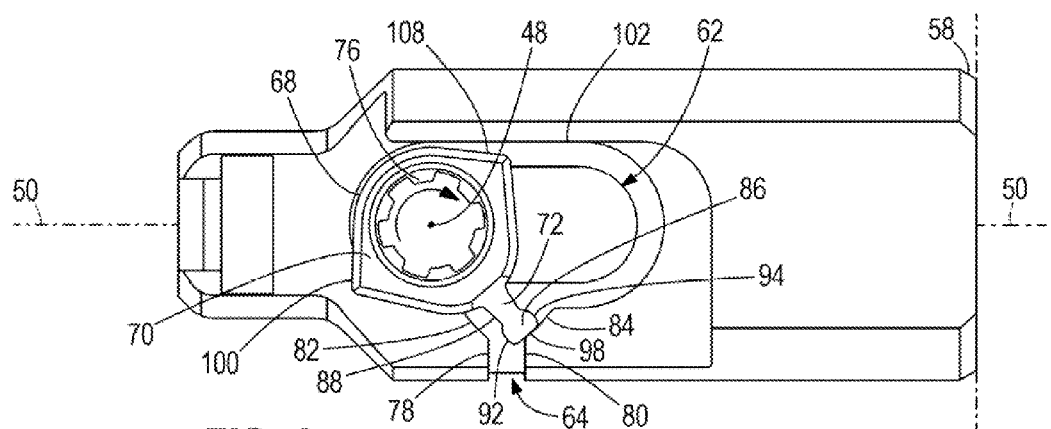
Figure 7:
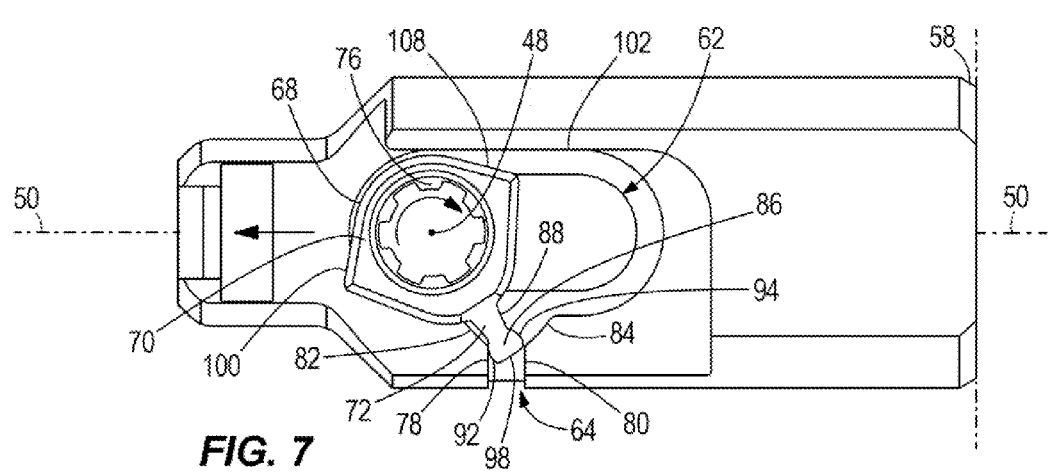
Figure 8:
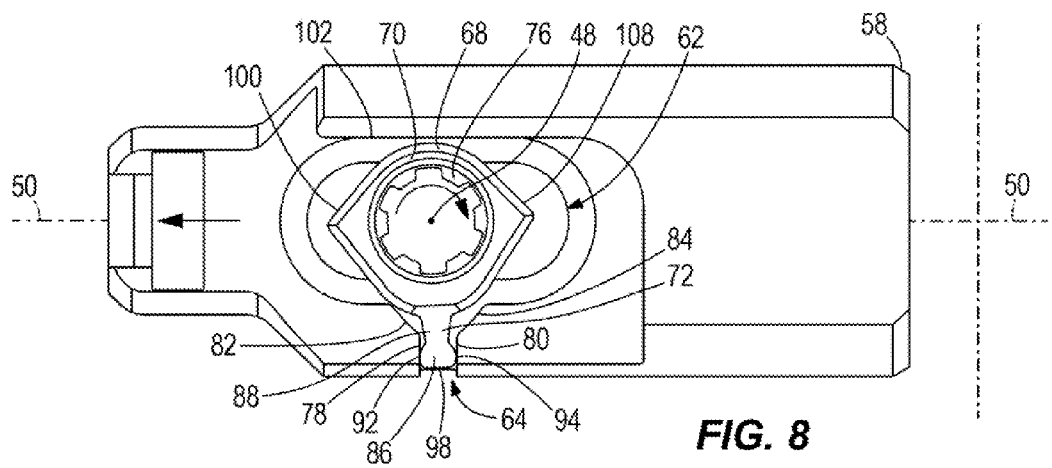
Figure 9:
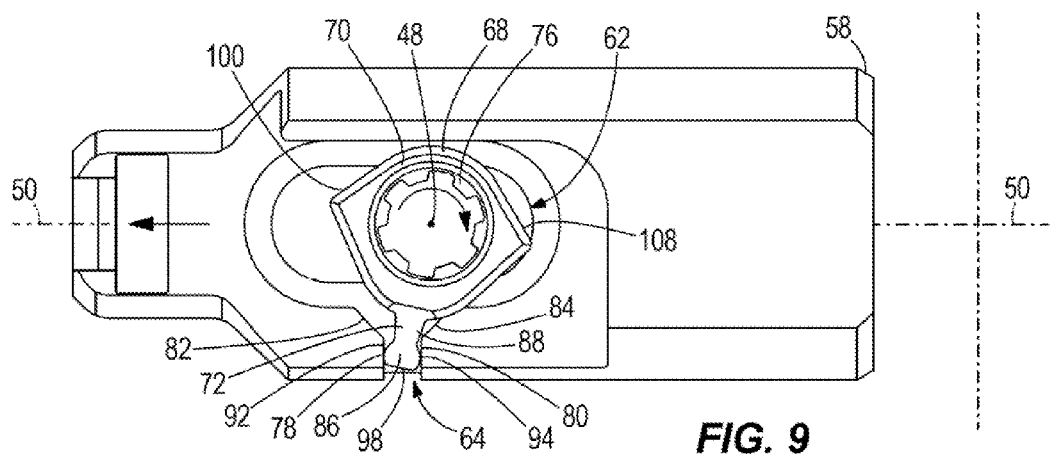

As shown in FIGS. 5 and 6, during rotation of the shift shaft 40 in the first direction, the cam follower 58 initially dwells or remains stationary with respect to the second axis 50. FIGS. 5 and 6 show that during the initial rotation of the shift shaft 40 in the first direction, the cam 68 rotates with respect to the cam follower 58 through a first dwell zone wherein the cam 68 does not engage with the cam follower 58. The arm 72 rotates past the first dwell surface 82, as shown in sequence from FIG. 5 to FIG. 6. The planar end surface 96 of the head 86 faces the first dwell surface 82 as the cam 68 rotates past the first dwell surface 82.

Figure 10:
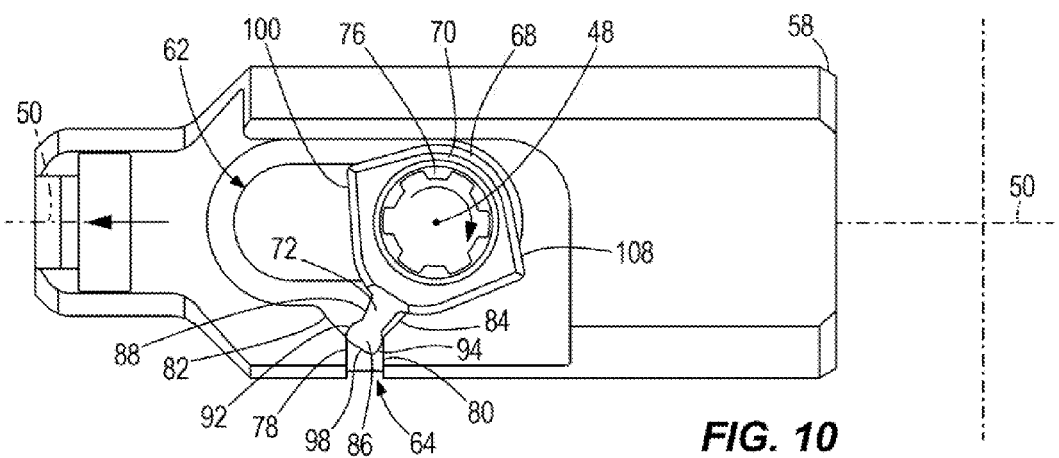

FIGS. 7-10 show during continued rotation of the shift shaft 40 in the first direction, wherein the cam follower 58 is moved by the cam 68 along the second axis 50, to thereby cause movement of the clutch 54. The cam 68 rotates through an actuating zone wherein the cam 68 engages with and moves the cam follower 58. The arm 72 engages with the first actuated surface 78 to move the cam follower 58. The convex first actuating surface 92 applies a camming force on the first actuated surface 78 during the rotation of the shift shaft 40 in the first direction shown in the figures. The camming force is applied until, as shown in FIG. 10, the arm 72 rotates/passes by the first actuated surface 78.

Figure 11:
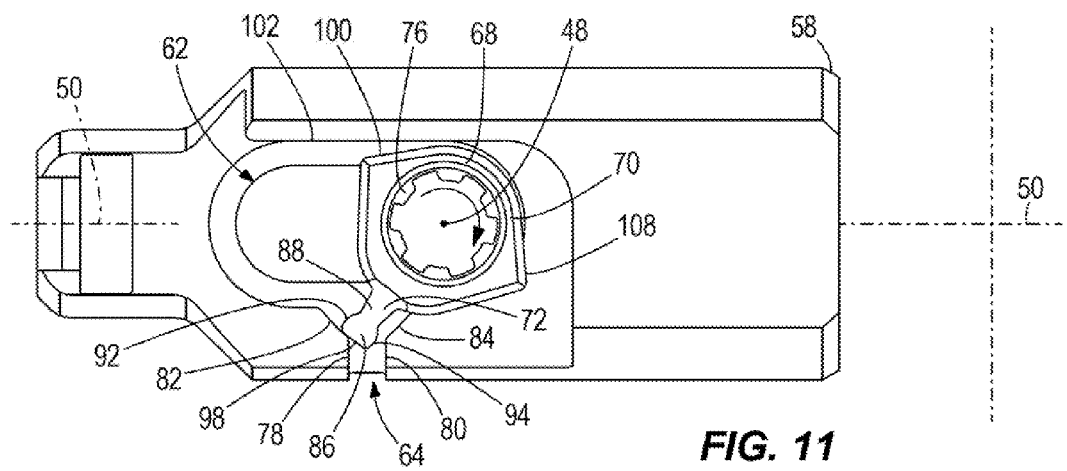
Figure 12:
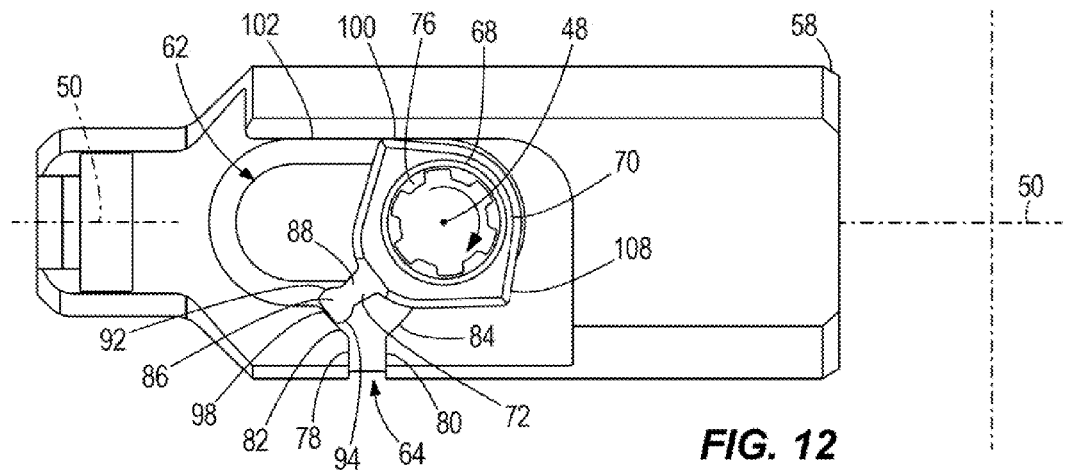

As shown in FIGS. 11 and 12, during continued rotation of the shift shaft 40 and cam 68 in the first direction, the cam follower 58 again dwells or remains stationary with respect to the second axis 50. Once the arm 72 of the cam 68 passes by the first actuated surface 78, the cam 68 then rotates through a second dwell zone wherein the cam 68 does not engage with the cam follower 58. The arm 72 rotates past the second dwell surface 84 as the planar end surface 96 of the head 86 faces the second dwell surface 84.

FIG. 12 depicts the body 70 of the cam 68 once it stops rotating with respect to the cam follower 58. The body 70 has a first stop surface 100 that engages with the cam follower 58 to stop rotation of the cam 68 in the first direction. In this example, the first stop surface 100 is on one of the flanges 118. The cam follower 58 has a stop wall 102 located on an opposite side of the recess 64 with respect to the second axis 50. The first stop surface 100 engages with the stop wall 102 to stop rotation of the cam 68 in the first direction. The first stop surface 100 radially extends from an upper portion of the body 70 with respect to the first axis 48. Referring to FIG. 4, a lower first side 104 of the body 70 engages with a first inside surface 106 of the pocket 62 when the first stop surface 100 engages with the stop wall 102, thereby preventing further rotation of the cam 68 with respect to the cam follower 58.

Due to the symmetrical nature of the cam 68 and pocket 62, the cam 68 interacts with the cam follower 58 in a mirror-like manner when the cam 68 is rotated in an opposite, counterclockwise, second direction with respect to the first axis 48. This movement is not shown in the drawings but would be clearly understood to one having ordinary skill in the art to be the opposite of the movement shown in FIGS. 5-12.

During rotation of the shift shaft 40 in the opposite, second direction about the first axis 48, the cam follower 58 first remains stationary with respect to the second axis 50 because the cam 68 initially rotates back through the noted second dwell zone as the arm 72 rotates past the second dwell surface 84. Next, the cam follower 58 is moved along the second axis 50 in a direction opposite the arrow shown in FIGS. 7-10 as the cam 68 engages with and causes the cam follower 58 to move along the second axis 50. As the cam 68 rotates back through the noted actuating zone, the arm 72 engages with the second actuated surface 80 to move the cam follower 58. The convex second actuating surface 94 applies a camming force on the second actuated surface 80 during the noted rotation of the shift shaft 40 in the second direction. Thereafter, the cam follower 58 again remains stationary with respect to the second axis 50 as the cam 68 again rotates back through the noted first dwell zone without engaging the cam follower 58. The arm 72 rotates past the first dwell surface 82.

FIG. 5 depicts the cam 68 once it finishes rotating in the noted counterclockwise, second direction. The cam 68 has an opposing, second stop surface 108 that engages with the cam follower 58 to stop rotation of the cam 68 in the noted second direction. The second stop surface 108 engages with the stop wall 102 of the cam follower 58 to stop the noted rotation of the cam 68 in the second direction. The second stop surface 108 is located on the other flange 118, with respect to the first stop surface 100. The second stop surface 108 radially extends from an opposite side of the upper portion of the body 70 with respect to the first axis 48 such that the second stop surface 108 is on an opposite side of the body 70 with respect to the first stop surface 100. As shown in FIG. 4, an opposite, second lower side 110 of the body 70 engages with a second inside surface 113 of the pocket 62 when the second stop surface 108 engages with the stop wall 102. As shown in FIGS. 5-12, the first and second inside surfaces 106, 112 are disposed on opposite sides of the recess 64 with respect to the second axis 50.

What is claimed is:

1. An apparatus for changing gear in a marine propulsion system, the apparatus comprising:
    a shift shaft that rotates about a first axis;
    a cam that rotates about the first axis with the shift shaft, the cam having a body and an arm that radially extends from the body with respect to the first axis;
    an output shaft that rotates about a second axis that is perpendicular to the first axis;
    a clutch that moves in a direction parallel to the second axis to enact a gear change in the marine propulsion system; and
    a cam follower that moves parallel to the second axis to cause movement of the clutch, thereby enacting the gear change, the cam follower defining a pocket that is elongated with respect to the second axis and a recess that extends from the pocket along a third axis that is perpendicular to the first and second axes, wherein the recess is at least partially defined by first and second dwell surfaces;
    wherein the cam is disposed in the pocket and the arm extends into the recess; and
    wherein during a constant rotation of the shift shaft in a first direction about the first axis, the cam follower moves with respect to the second axis to enact the gear change and also dwells with respect to the second axis as the arm rotates past the first and second dwell surfaces.

2. The apparatus according to claim 1, wherein during said constant rotation of the shift shaft in the first direction, the cam follower first remains stationary with respect to the second axis as the arm rotates past the first dwell surface, then is moved along the second axis to cause movement of the clutch, and thereafter again remains stationary with respect to the second axis as the arm rotates past the second dwell surface.

3. The apparatus according to claim 2, wherein during a constant rotation of the shift shaft in an opposite, second direction about the first axis, the cam follower first remains stationary with respect to the second axis as the arm rotates past the second dwell surface, then is moved along the second axis to cause movement of the clutch, and thereafter again remains stationary with respect to the second axis as the arm rotates past the first dwell surface.

4. The apparatus according to claim 3, wherein the body comprises a first stop surface that engages with the cam follower to stop rotation of the cam in the first direction and an opposing, second stop surface that engages with the cam follower to stop rotation of the cam in the second direction.

5. The apparatus according to claim 4, wherein the cam follower comprises a stop wall located on an opposite side of the recess with respect to the second axis, wherein the first stop surface engages with the stop wall to stop said rotation of the cam in the first direction and wherein the second stop surface engages with the stop wall to stop said rotation of the cam in the second direction.

6. The apparatus according to claim 5, wherein the first and second stop surfaces radially extend from an upper portion of the body with respect to the first axis, and wherein a first lower side of the body engages with a first inside surface of the pocket when the first stop surface engages with the stop wall and wherein an opposite, second lower side of the body engages with a second inside surface of the pocket when the second stop surface engages with the stop wall.

7. The apparatus according to claim 6, wherein the first and second inside surfaces are disposed on opposite sides of the recess with respect to the second axis.

8. The apparatus according to claim 1, wherein during said constant rotation of the shift shaft in the first direction, the cam initially rotates with respect to the cam follower, the cam then engages with and causes the cam follower to move along the second axis, and the cam then again rotates with respect to the cam follower.

9. The apparatus according to claim 8, wherein during a constant rotation of the shift shaft in a second, opposite direction about the first axis, the cam initially rotates with respect to the cam follower, the cam then engages with and causes the cam follower to move along the second axis, and the cam then again rotates with respect to the cam follower.

10. The apparatus according to claim 1, wherein when the shift shaft rotates with respect to the first axis in the first direction, the cam first rotates through a first dwell zone wherein the cam does not cause movement of the cam follower, the cam then rotates through an actuating zone wherein the cam engages with and moves the cam follower, and the cam then rotates through a second dwell zone wherein the cam does not cause movement of the cam follower.

11. The apparatus according to claim 10, wherein when the shift shaft rotates with respect to the first axis in an opposite, second direction with respect to the first axis, the cam rotates back through the second dwell zone, the cam then rotates back through the actuating zone, and the cam then rotates back through the first dwell zone.

12. An apparatus for changing near in a marine propulsion system, the apparatus comprising:
a shift shaft that rotates about a first axis;
a cam that rotates about the first axis with the shift shaft, the cam having a body and an arm that radially extends from the body with respect to the first axis;
an output shaft that rotates about a second axis that is perpendicular to the first axis;
a clutch that moves in a direction parallel to the second axis to enact a gear change in the marine propulsion system; and
a cam follower that moves parallel to the second axis to cause movement of the clutch, thereby enacting the gear change, the cam follower defining a pocket that is elongated with respect to the second axis and a recess that extends from the pocket along a third axis that is perpendicular to the first and second axes;
wherein the cam is disposed in the pocket and the arm extends into the recess; and
wherein during a constant rotation of the shift shaft in a first direction about the first axis, the cam follower moves with respect to the second axis to enact the gear change and also dwells with respect to the second axis;
wherein during said constant rotation of the shift shaft in the first direction, the cam follower first remains stationary with respect to the second axis, then is moved along the second axis to cause movement of the clutch, and thereafter again remains stationary with respect to the second axis:
wherein during a constant rotation of the shift shaft in an opposite, second direction about the first axis, the cam follower first remains stationary with respect to the second axis, then is moved along the second axis to cause movement of the clutch, and thereafter again remains stationary with respect to the second axis; and
wherein the recess is at least partially defined by first and second actuated surfaces that extend along the third axis and first and second dwell surfaces that extend at opposite taper angles with respect to the third axis.

13. The apparatus according to claim 12, wherein the recess, viewed in a plane defined by the second and third axes, has a Y-shape.

14. The apparatus according to claim 12, wherein during said constant rotation of the shift shaft in the first direction, the arm first rotates past the first dwell surface, the arm then engages with the first actuated surface to move the cam follower, and the arm then rotates past the second dwell surface.

15. The apparatus according to claim 14, wherein during said constant rotation of the shift shaft in the second direction, the arm first rotates past the second dwell surface, then arm then engages with the second actuated surface to move the cam follower, and the arm then rotates past the first dwell surface.

16. The apparatus according to claim 15, wherein the arm comprises a head and stem, the stem having a first end connected to the body and a second end connected to the head, wherein the head, viewed in a plane defined by the second and third axes, is wider than the stem.

17. The apparatus according to claim 16, wherein the head has opposing first and second convex actuating surfaces that engage with the first and second actuated surfaces of the recess.

18. The apparatus according to claim 17, wherein the convex actuating surfaces apply a camming force on the first actuated surface during said constant rotation of the shift shaft in the first direction and on the second actuated surface during said constant rotation of the shift shaft in the second direction.

19. The apparatus according to claim 18, wherein the head has a planar end surface that extends between the actuating surfaces and that faces the first and second dwell surfaces when the cam rotates past the first and second dwell surfaces, respectively.

20. An apparatus for changing gear in a marine propulsion system, the apparatus comprising:
- a shift shaft that rotates about a first axis;
- a cam that rotates about the first axis with the shift shaft, the cam having a body and an arm that radially extends from the body with respect to the first axis;
- an output shaft that rotates about a second axis that is perpendicular to the first axis;
- a clutch that moves in a direction parallel to the second axis to enact a gear change in the marine propulsion system; and
- a cam follower that moves parallel to the second axis to cause movement of the clutch, thereby enacting the gear change, the cam follower defining a pocket that is elongated with respect to the second axis and a recess that extends from the pocket along a third axis that is perpendicular to the first and second axes;
- wherein the cam is disposed in the pocket and the arm extends into the recess;
- wherein when the shift shaft is rotated with respect to the cam follower, the cam first rotates through a first dwell zone wherein the cam does not move the cam follower, the cam then rotates through an actuating zone wherein the cam engages with and moves the cam follower, and the cam then rotates through a second dwell zone wherein the cam follower does not move the cam follower;
- wherein the recess is at least partially defined by first and second actuated surfaces that extend along the third axis and first and second dwell surfaces that extend at opposite taper angles with respect to the third axis; and
- wherein when the shift shaft rotates in the first direction, the arm rotates past the first dwell surfaces in the first dwell zone, then the arm engages the first actuating surface in the first actuating zone, and then the arm rotates past the second dwell surface in the second dwell zone.

* * * * *